United States Patent [19]

Hachgenei et al.

[11] Patent Number: 5,215,732

[45] Date of Patent: Jun. 1, 1993

[54] METHOD FOR PRODUCING ALKALI METAL SILICATES BY HEATING CRISTOBALITE OR TEMPERED QUARTZ SAND WITH NAOH OR KOH UNDER ATMOSPHERIC PRESSURE

[75] Inventors: Johannes W. Hachgenei; Rudolf Novotny; Peter Christophliemk; Hans Dolhaine; Juergen Foell, all of Duesseldorf, Fed. Rep. of Germany

[73] Assignee: Henkel Kommanditgesellschaft auf Aktien, Duesseldorf, Fed. Rep. of Germany

[21] Appl. No.: 859,427

[22] PCT Filed: Nov. 14, 1990

[86] PCT No.: PCT/EP90/01947

§ 371 Date: May 26, 1992

§ 102(e) Date: May 26, 1992

[87] PCT Pub. No.: WO91/08169

PCT Pub. Date: Jun. 13, 1991

[30] Foreign Application Priority Data

Nov. 23, 1989 [DE] Fed. Rep. of Germany ....... 3938729

[51] Int. Cl.⁵ ............................................. C01B 33/32
[52] U.S. Cl. .................................... 423/334; 252/135
[58] Field of Search ....................... 423/332, 333, 334; 252/135

[56] References Cited

U.S. PATENT DOCUMENTS

| 4,022,704 | 5/1977 | Balfanz et al. | 252/135 |
| 4,770,866 | 9/1988 | Christophliemk et al. | 423/334 |
| 5,000,933 | 3/1991 | Novotny et al. | 423/334 |
| 5,084,262 | 1/1992 | Novotny et al. | 423/334 |

FOREIGN PATENT DOCUMENTS

| 0164073 | 12/1985 | European Pat. Off. | 423/334 |
| 2078701 | 1/1982 | United Kingdom | 423/334 |

*Primary Examiner*—Olik Chaudhuri
*Assistant Examiner*—Ken Horton
*Attorney, Agent, or Firm*—Ernest G. Szoke; Wayne C. Jaeschke; Norvell E. Wisdom, Jr.

[57] ABSTRACT

Method for producing alkali metal silicates from crystalline siliceous material and aqueous alkali metal hydroxide solution at high temperature and normal pressure, characterized in that cristobalite and/or tempered quartz sand are used as the siliceous material, and this material is reacted with aqueous, 20 to 50 wt. % sodium or potassium hydroxide solution at temperatures of 100° to 150° C. and normal pressure, the molar ratio of $SiO_2$ to $Na_2O$ or $K_2O$ in the reaction mixture being between 2:1 and 1:7.

20 Claims, No Drawings

5,215,732

METHOD FOR PRODUCING ALKALI METAL SILICATES BY HEATING CRISTOBALITE OR TEMPERED QUARTZ SAND WITH NAOH OR KOH UNDER ATMOSPHERIC PRESSURE

BACKGROUND OF THE INVENTION

1.

The invention relates to a process for the production of alkali metal silicates from crystalline $SiO_2$-containing material and aqueous alkali metal hydroxide solution at elevated temperature and under normal pressure.

2. Statement of Related Art

Alkali metal silicates, e.g. water glasses, are produced in large quantities and are used both in solution and also as solids in many fields. Among such are washing and cleaning agents, adhesives, paints, the floatation of ore, and water treatment. They also serve as raw materials for the production of zeolites as well as silicic acids, silica sols, and silica gels (Buchner et. al., Industrielle Anorganishce Chemie (Industrial Inorganic Chemistry), Verlag Chemie, 1984 p. 333).

Waterglass solutions are usually characterized by two physical values. Firstly, by the molar ratio $SiO_2/M_2O$, hereafter referred to as the modulus, and by the solids content, i.e. the proportion by weight of $SiO_2$ and $M_2O$ in the solution, where M stands for Na or K. Both factors influence the viscosity of the alkali metal silicate solution.

The maximum solubility of an alkali metal silicate with a specific modulus can be determined from tables and diagrams. Generally, at higher alkali contents, i.e. a lower modulus, higher solids contents can be achieved in the solution. Waterglasses up to a modulus of 4.3 are obtained via melting processes. Such melting processes have already been known since the last century; the only process still used nowadays is the conversion of quartz sand with soda at temperatures around 1500° C. (Winnacker-Kuchler, Chemische Technologie (Chemical Technology), C. Hanser Verlag, 4th Edition (1983), Volume 3, Anorganishce Technologie II (Inorganic Technology II), page 58 et seq.). Only a small proportion of the alkali metal silicate prepared in this way is sold as solid glass. Most of it is subsequently dissolved in water. For glasses with a modulus >2.0 the reaction velocity at the reflux temperature of the solution is not satisfactory, so that a pressurized decomposition at 4–6 bar and 150° C. is preferred.

Low molecular ratio waterglasses (modulus <2.7) which are richer in alkali can also be prepared hydrothermally e from quartz sand and concentrated aqueous sodium hydroxide solution. For that purpose, because of the low reactivity of quartz sand, raised temperatures and increased pressure are necessary. In industry two processes are used: nickelplated rotating pressure dissolvers at temperatures of 200 to 220 ° C. and tubular reactors at temperatures of 250° to 260 ° C. (Winnacker-Kuchler, loc. cit., page 61 et seq.).

Finely divided, amorphous silicic acids dissolve exothermically in alkali lyes. Thus, occasionally particularly pure alkali metal silicate solutions are obtained by the reaction of pyrogenic or precipitated silicic acid with an alkali lye. Apart from special cases, this process is & too costly.

Amorphous silicic acid also occurs as by-product or waste in various industrial processes. Numerous processes for employing such silicic acids are documented.

According to Przem. Chem. 67(8) (1988) 384-6 (Chemical Abstracts 109:214144f), sodium silicate solutions with a middling modulus can be obtained from the waste silicic acid from the preparation of $AlF_3$ and HF.

According to JP-76 17519 (Chemical Abstracts, 86:19 116 g) dust from the preparation of ferrosilicon contains about 90 wt-% of highly-reactive $SiO_2$, which can be converted with 8.1% sodium hydroxide solution at temperatures around 90° C. to a waterglass solution with a high modulus.

As another alkali metal silicate, solid crystalline anhydrous sodium polysilicate $(Na_5SiO_2)_{oo}$ has industrial importance as builder component in washing and cleaning agents. This sodium silicate with the empirical composition $Na_2SiO_3$ contains endless chains of $SiO_4$ tetrahedrons, which are bonded to the sodium atoms via bridges. Such chain silicates are called "inosilicates" in mineralogy and "polysilicates" in chemistry. The term "metasilicate" is widely used but incorrect. Hereinafter only the term "sodium polysilicate" is employed.

Anhydrous sodium polysilicate is prepared on a major industrial scale by a tempering reaction of quartz sand and soda in a rotary tube furnace at about 950° C. (Buchner et. al. Industrielle Anorganische Chemie, Verlag Chemie, 1984, p. 333). For this purpose the reaction time is about 45 min. At still higher temperature, when reaction times are, however, shorter, the polysilicate can also be obtained by melting sand and soda (Ullmann's Encylkopadie der technischen Chemie (Ullmann's Encyclopedia of Technical Chemistry), Verlag Chemie, 1982, Vol. 21, p. 412).

Furthermore, U.S. Pat. No. 3,532,458 describes the hydrothermal production of sodium polysilicate, starting from quartz sand. Temperatures of about 200° C. under increased pressure are necessary for complete reaction of the quartz sand with aqueous sodium hydroxide solution.

DE-AS 15 67 572 proposes the preparation of anhydrous, crystalline alkali metal silicates, preferably sodium polysilicate, by producing a film on finely divided, solid alkali metal silicate, which is heated to a temperature above 130° C. and kept in continual motion, by spraying an aqueous alkali metal silicate solution onto it and evaporating off the water by means of an additional hot stream of gas, the coating and drying steps being repeated until the size of the crystalline anhydrous alkali metal silicate particles has increased to the desired extent. Generally, a part of the substantially anhydrous alkali metal silicate produced is recycled to the continuous process as a starting component.

The disadvantages of this last-mentioned process are that in the sodium polysilicate which is kept constantly in movement one needs a large number of sodium polysilicate particles as the inoculation basis and that therefore a very large proportion of the spray granulate produced must be re-ground and recycled, so that ultimately the yield of this process is low.

It is further known from DE-PS 968 034 to produce solid sodium polysilicate containing water of crystallization in such a way that finely-divided silicic acid, such as quartz sand or quartz flour, and aqueous sodium hydroxide e solution are homogeneously mixed together in a ratio which approximately corresponds to the ratio of alkali metal oxide: $SiO_2$ in the product to be prepared, the mixture is continuously conveyed into a reaction tube against the pressure prevailing therein and passed through the reaction tube at temperatures above approximately 175° C. and under increased pressure, with the proviso that an even distribution of the silicic acid in the mixture is ensured by regulating the linear flow rate. Subsequently the hot reaction product is allowed to leave the reaction tube through an expansion valve, so that the initially higher water content of the reaction product formed is reduced, as a result of the water evaporation occurring upon expansion, to the desired water content of the end product. In this way it is possible to produce hydrated sodium polysilicate with less than 9 moles of water of crystallization.

It is further known from NL-OS 78 02 697 to produce sodium silicate solutions by passing sand with sodium hydroxide solution under raised pressure and at a temperature of at least 200° C. through a tube, which can be used for the continuous treatment of bauxite and which is known from e.g. DE-OS 21 06 198 as well as DE-OS 25 14 339. For the production of metasilicate products one works preferably at a temperature of 200° to 240 ° C.; for the production of products with a higher ratio of $SiO_2:Na_2O$ one preferably uses temperatures from 240° to 280 ° C. The pressure in the tube preferably lies in the range between 10,000 and 20,000 kPa. However, according to the processes described in this Offenlegungsschrift (published German patent application) only solutions and not solid products are produced.

DE-OS 31 24 893 describes a process for the production of anhydrous sodium polysilicate by treatment of quartz sand and/or quartz flour with concentrated aqueous sodium hydroxide solution under pressure at a temperature in the range of 200° to 400 ° C.

RO 75620 (Chemical Abstracts 100:24023U) describes a process for the production of crystalline sodium polysilicate with a modulus of 1:1 from silicon dioxide-containing waste products from the manufacture of fertilizers. This process is thereby characterized, that the solution containing sodium polysilicate must first be filtered, in order to remove impurities, before the filtrate is concentrated. Then crystallization occurs on cooling the solution down to a temperature of 10° to 15 ° C.

SU-434060 (Chemical abstracts 82:45938w) describes a process for the production of sodium polysilicate from volcanic ash.

JP-73/16438 (Chemical Abstracts 80:17050R) describes a process for the production of sodium polysilicate-containing solutions from flue gas residues.

These three last-mentioned processes however have the disadvantage that the $SiO_2$ sources used are contaminated and the removal of the impurities makes for considerable difficulties, so that up until now these processes have not proved successful (Winnacker-Kuchler, loc. cit., page 61).

Description of the Invention

In contrast to this it is the object of the present invention to develop a process for the production of alkali metal silicate solutions and suspensions which can be carried out with the use of crystalline $SiO_2$ material under normal pressure and the employment of relatively low temperatures with short reaction times.

SUMMARY OF THE INVENTION

The objective is achieved according to the invention by a process for the production of alkali metal silicates from crystalline $SiO_2$-containing material and aqueous alkali metal hydroxide solution at raised temperature and under normal pressure, characterized in that as crystalline $SiO_2$-containing material one uses cristobalite and/or tempered quartz sand and reacts this material with aqueous, 20 to 50 wt-% sodium or potassium hydroxide solution at temperatures in the range of 100° to 150 ° C. and under normal pressure, the molar ratio of $SiO_2$ to $Na_2O$ or $K_2O$ in the reaction mixture lying in the range of 2:1 to 1:7.

Compared with quartz, cristobalite (or tridymite) displays a higher reactivity because of its more open structure (density of quartz=2.65 $g/cm^3$, cristobalite/tridymite =2.3 $g/cm^3$). Besides cristobalite, tridymite also can be used for the process according to the invention, if need be together with amorphous silicon dioxide, which likewise shows a higher reactivity because of its more open structure in comparison with quartz. Tempered quartz sands, i.e. quartz sands which have been tempered above 1000° C., preferably at 1300° to 1600 ° C., with the addition of catalytic quantities of alkali and which comprise cristobalite, tridymite and possibly amorphous silicon dioxide, also behave similarly. By tempering quartz sand one obtains reactive $SiO_2$ phases which comprise inter alia cristobalite, tridymite, and amorphous $SiO_2$, as described in the unpublished German Patent Application P 39 38 730.5. The subject of this Patent Application is a process for the production of reactive silicon dioxide phases, which is thereby characterized, that one mixes quartz sand with an alkali e metal compound or its aqueous solution, the alkali metal compound being chosen from the group of compounds which are transformed into the corresponding alkali metal oxides on being heated, that the molar ratio of $SiO_2$ to alkali metal oxide amounts to between 1:0.0025 and 1:.0 and that one heats this mixture to a temperature between 100° C. and 1700° C.

In connection with the implementation of the process according to the invention, explicit reference is made to the disclosure of this Patent Application.

The tempered quartz sands are obtained from little-contaminated starting compounds, i.e. quartz sands as also used for producing waterglass in the melting process. This offers the advantage that during processing, i.e. in any desired filtering of the alkali metal silicate solutions, no additional residues arise and thus an already established technique can be applied. This is in contrast to the already-discussed problematical processing of alkali metal silicate solutions, which are obtained from waste silicic acids.

DESCRIPTION OF PREFERRED EMBODIMENTS

The aqueous sodium or potassium hydroxide solutions used for the decomposition treatment have a concentration of 20 to 50 wt-%, for NaOH in particular a concentration of to 50 wt-%, especially 50 wt-% sodium hydroxide, which corresponds to the industrially available product. The concentration of the potassium hydroxide solution amounts preferably to 40 to 50 wt-%, especially 47 to 50 wt-%.

The tempered quartz sands are brought to reaction (cf. Examples, Table 1) with aqueous sodium hydroxide or potassium hydroxide at the boiling point of each lye or the resulting alkali metal silicate solution or suspension. The boiling point, depending on the salt content of the solution, amounts to between 150° and 100 ° C. and is not constant, because the salt content changes during the course of the reaction.

As an example of the tempered quartz sand, cristobalite has found use as the $SiO_2$ source. The particle size amounted, in general, to 0.1 to 0.8 mm.

The process according to the invention can be carried out batchwise as well as continuously and, depending on the $SiO_2$/alkali metal oxide modulus used, is suitable for the production of alkali metal silicate suspensions or solutions. With sodium hydroxide, there result suspensions of sodium polysilicate in the $SiO_2:Na_2O$ modulus range of 1.2:1 to 1:2, preferably of 1:1; i.e. the sodium polysilicate is obtained as a solid, crystalline phase. With a $SiO_2:Na_2O$ modulus of 2:1, amorphous sodium silicates are formed, which likewise are obtained in solid form, i.e. as a suspension. On the other hand, in the $SiO_2:Na_2O$ modulus ranges of 1:>2, i.e. from 1:>2 to 1:7, with sodium hydroxide soluble, alkali-rich sodium silicates, i.e. aqueous sodium waterglass solutions, are obtained.

With potassium hydroxide, on carrying out process according to the invention over the whole $SiO_2:K_2O$ modulus range from 2:1 to 7, there result only soluble, alkali-rich potassium silicates, i.e. aqueous potassium water glass solutions.

For the purposes of the present invention it is preferred that one reacts the crystalline $SiO_2$-containing material with aqueous sodium hydroxide solution, the molar ratio of $SiO_2$ to $Na_2O$ in the reaction mixture lying in the range of 1.2:1 to 1:2, preferably 1:1.

Furthermore it is preferred according to the invention that one reacts the crystalline $SiO_2$-containing material with aqueous sodium hydroxide solution, the molar ratio of $SiO_2$ to $Na_2O$ in the reaction mixture amounting to 2:1.

In Table 2 (cf. Examples) there are given the times, which are necessary for the complete dissolution of the $SiO_2$ used, depending on the input modulus and on the concentration of the alkali metal hydroxide.

Surprisingly it has now been found that—according to a preferred embodiment of the invention—tempered quartz sand, even with a $SiO_2/Na_2O$ ratio of 2:1, still dissolves completely within three hours without pressure in 50% sodium hydroxide solution. With a 65% solids content, the solubility of the alkali metal silicate formed is clearly exceeded, and towards the end of the reaction a viscous material, which can hardly be stirred, is obtained. In other words this means that the $SiO_2$ used can be converted without the application of pressure into sodium silicate, which is immediately soluble in water.

From the Examples (Table 2) it is clearly to be seen that on decrease of the intended modulus (thus less $SiO_2$ relative to $Na_2O$) the time for complete dissolution of the $SiO_2$ falls. On the other hand, the rate of dissolution also falls with reducing concentration of the alkali metal hydroxide.

The particular advantage of this process becomes clear on comparison of the values in Table 3 (Comparative Examples). One recognizes that untreated quartz sand dissolves much more slowly in sodium hydroxide solution. With a modulus of 1:1, on the other hand, tempered quartz sands are dissolved completely in boiling 50% sodium hydroxide solution within two hours. As compared therewith, quartz sand is only 43% dissolved after 6.5 hours; quartz flour with a greater surface area is also only 62% reacted away after 6 hours.

In order to achieve the highest reaction velocity possible, the process is advantageously carried out at the boiling point of the aqueous alkali metal hydroxide solution or respectively of the resulting alkali metal silicate solution or suspension. Lower temperatures slow down the reaction. Higher temperatures would indeed increase the reaction velocity, but require increased pressure and therefore pressure vessels, which render such a process less economical. When normal pressure is referred to in connection with the process according to the invention, the usual ambient pressure of ca. 1 bar is to be understood. Otherwise expressed this means that for the purposes of the present invention operations are carried out without increased pressure.

In Tests 1, 2, 4 to 7 and 10 (cf. Examples, Table 2) the solubility of the sodium silicate formed was exceeded. In Tests 1 and 2 with the modulus 2:1, the solid which was separated while still warm, was amorphous under X-ray.

In the reactions with a $SiO_2/Na_2O$ molar ratio of 1.2:1 to 1:2, preferably 1:1, solid, crystalline sodium polysilicate, $Na_{SiO_3}$, was formed, which was characterized by means of X-ray diffraction diagrams (compare with JCPDS Data File No. 16-818 —Joint Committee for Powder Diffraction Standards). The silicate had good water-solubility and after drying had 0.015 to 0.18% insoluble constituents. The same crystalline silicate was obtained from the reactions with 50% sodium hydroxide solution and $SiO_{2/\ Na_2O}$ input ratios of 1:1.5 and 1:2 (Tests 7 and 10).

The sodium silicate suspensions obtained can be diluted by addition of water, until the solubility of the alkali metal silicates is not exceeded.

In further tests with higher alkali contents, i.e. $SiO_2$ $Na_2O$ modulus=1:>2, sodium silicate solutions were formed with low levels of insoluble constituents, which derive from impurities in the starting compounds. The slightly cloudy solutions can be clarified by filtration. Also with Tests 22 to 24, carried out with potassium hydroxide (cf. Examples, Tables 1 and 2), solutions of potassium silicate formed which likewise were virtually clear.

As described above it has surprisingly been found that the increased reactivity of the specified compounds, i.e. cristobalite and/or tempered quartz sand, can be used advantageously for the production of solid, crystalline sodium polysilicate. Furthermore in the process according to the invention for the production of sodium polysilicate it is not necessary to purify the resultant polysilicate by means of a cleaning step preceding the crystallization.

The preferred possibility of using the process according to the invention for the production of sodium polysilicates is demonstrated by further Examples (Table 4). Also in this preferred embodiment of the present invention the process is carried out in the temperature range of 100° C. to 150° C. under normal pressure. In this temperature range the process according to the invention can be carried out in an open reaction vessel, because the high salt content of the reaction mixture causes a shift in the boiling point of the aqueous reaction mixture to higher temperatures. Thus, by way of example, in the reaction of cristobalite with aqueous 50 wt-% sodium hydroxide solution in the $SiO_2$ $Na_2O$ molecular ratio of 1:1 at an initial temperature of about 150° C. and under normal pressure (1 bar), after a reaction time of two hours a sodium polysilicate can be obtained which still contains water-insoluble residues of only 0.015 wt-%.

As the Examples (Table 4) show in more detail, to carry out the process cristobalite or tempered quartz sand, i.e. cristobalite, tridymite, and amorphous silicon dioxide, were brought to reaction with the specified quantities of aqueous lye. The reactions were carried out under normal pressure in a glass flask.

According to a further embodiment of the present invention, after completion of the reaction for preparing solid, crystalline sodium polysilicate ($SiO_2:Na_2O$-modulus =1:1) the suspension, still warm at a temperature of 70 to 130 °C., preferably 90 to 110° C., was filtered by means of a suction filter. In the process according to the invention concentration down or cooling off of the reaction solution is not necessary for the initiation or improvement of crystallization. The filtrate (mother liquor) arising from filtration is preferably recycled into the process after being concentrated down. The sodium polysilicate remaining behind as filter residue is as a rule broken up while still warm (70° to 90° C.) and then dried under reduced pressure (1333 pa to 26664 Pa) at raised temperature (100° to 150° C.) to give anhydrous sodium polysilicate. The duration of the drying can last between 5 and 15 hours. By the "anhydrous sodium polysilicate" obtained by the process according to the invention there is to be understood a sodium polysilicate, which on average contains not more than 5 wt-% and preferably less than 3.5 wt-% of water. The water content is determined by determination of the calcination loss during heating to 1000° C. In X-ray diffraction diagrams only crystalline, anhydrous sodium polysilicate can be recognized (compare with JCPDS-Data File No. 16-818).

The suspensions of amorphous sodium silicate with a $SiO_2:Na_2O$ modulus of 2:1 are also worked up in the same way.

The particular advantage of the process is to be seen from Examples 25, 26 and 28, in which the tempered quartz sand was reacted without pressure directly with sodium hydroxide solution to yield sodium polysilicate. Here also the sodium polysilicate is obtained in a practically quantitative reaction. In Examples 25 and 26 the reaction suspension was heated to boiling point under normal pressure. The boiling point decreased during the course of the reaction, because the sodium hydroxide reacts away. In Example 27 the suspension was maintained at a temperature of 100° C. This temperature is not sufficient for a complete reaction within 2 hrs. Example 28 shows that a tempered quartz sand consisting of cristobalite, tridymite, and amorphous silicon dioxide has the same reactivity as cristobalite.

With the process according to the invention for the production of alkali metal silicates it is thus possible, without pressure and depending on the chosen $SiO_2$-$Na_2O$ modulus, to achieve suspensions of amorphous sodium silicate or crystalline sodium polysilicate, which then, if desired, can be dehydrated using suitable known procedures. The possibility is also opened up of producing without pressure, i.e. under normal pressure, solutions of sodium or potassium silicates which are richer in alkali.

The following Examples illustrate the invention, without limiting it in any way.

EXAMPLES

The tests were carried out in a 1-liter glass three-necked round-bottomed flask fitted with a reflux condenser, impeller blade, and thermometer under normal pressure. The flask was heated in a heating mantle.

The aqueous alkali metal hydroxide solution (e.g. 50 wt-% NaOH, techn. grade or 47 wt-% KOH, techn. grade, or solutions suitably diluted with water) was introduced and heated until boiling. Thereafter the weighed amount of cristobalite was added. The boiling point decreased during the course of the reaction, because the alkali metal lye used reacted to form the alkali metal silicate (e.g. sodium silicate). The reaction time was 30 to 350 minutes, preferably 30 to 210 minutes.

The initial ratios for the individual Tests 1 to 24 (1 to 21 with NaOH; 22 to 24 with KOH) are given in Table 1. Table 2 shows the reaction parameters for these Tests. Values for corresponding comparative Examples, in which quartz or quartz flour was used instead of cristobalite as the $SiO_2$ source, appear in Table 3.

TABLE 1

Initial ratios for the production of alkali metal silicate solutions and suspensions

| Test No. | Tempered quartz sand [g] | NaOH (50 wt-%) [g] | $H_2O$ [g] |
|---|---|---|---|
| 1 | 525 | 700 | — |
| 2 | 420 | 560 | 140 |
| 3 | 240 | 320 | 213 |
| 4 | 250 | 700 | — |
| 5 | 200 | 560 | 140 |
| 6 | 170 | 490 | 210 |
| 7 | 175.3 | 700 | — |
| 8 | 140.2 | 560 | 140 |
| 9 | 105.2 | 420 | 280 |
| 10 | 131.5 | 700 | — |
| 11 | 105.2 | 560 | 140 |
| 12 | 78.9 | 420 | 280 |
| 13 | 87.6 | 700 | — |
| 14 | 70.1 | 560 | 140 |
| 15 | 52.6 | 420 | 280 |
| 16 | 52.6 | 700 | — |
| 17 | 42.1 | 560 | 140 |
| 18 | 31.6 | 420 | 280 |
| 19 | 30.1 | 560 | 140 |
| 20 | 22.5 | 420 | 280 |
| 21 | 15 | 280 | 420 |
| 22 | 176 | 700 | — |
| 23 | 112.4 | 447 | 253 |
| 24 | 44.6 | 500 | — |

In order to monitor the course of the reaction, samples (about 3 ml) were regularly taken from the reaction mixture. These samples were diluted with water to about 50 ml and titrated with a 0.1 N hydrochloric acid solution to (determine) the $M_2O$-content. Addition of solid NaF to these sample solutions made possible the titrimetric determination of the dissolved $SiO_2$ content. With these two measured values the modulus of the alkali metal silicate solution or suspension can be calculated. On attaining the modulus aimed for, which was set by the choice of the starting concentrations, the reaction was stopped. Likewise towards the end of the reaction the boiling point of the reaction mixture remained constant.

In Tests 1, 2, 4 to 7, and 10 the reaction suspension was cooled down to about 90° C. and filtered over a suction filter. The sodium silicate remaining behind as filter residue was as a rule broken up while still warm and then dried under reduced pressure and at raised temperature (100° to 150° C.). For determination of insoluble components, 10 g of the dried filter residue was stirred in 1000 ml at 60° C. for 5 mins. and filtered off via an ash-free filter. This filter was calcined and the residue remaining weighed out.

PRODUCTION OF SODIUM POLYSILICATE

Reaction parameters for the individual Examples are in Table 4. The reactions were carried out in two ways:

A: Three-necked flask with impeller blade, thermometer and reflux condenser, heating mantle B: Similar to A, but able to be heated over an oil bath.

Tests 25 to 27 relate to reactions with cristobalite, Test 28 concerns the reaction of tempered quartz sand (1400° C., 5 wt-% NaOH addition), consisting of cristobalite, tridymite, amorphous silicon dioxide, and low levels of sodium silicate.

In all cases the determination of the calcination loss was carried out after breaking up and drying of the filter residue.

TABLE 2

Reaction Parameters for the Production of Alkali Silicate Solutions and Suspensions

| Test No. | Modulus | Solids Content [Wt-%] | Temperature [°C.] | Time [Min.] | |
|---|---|---|---|---|---|
| | | Conc. of NaOH [Wt-%] | | | |
| 1 | 2:1 | 50 | 65 | 146–112 | 180) X-ray amorphous solid |
| 2 | " | 40 | 57 | 131–107 | 310) isolated as residue |
| 3 | " | 30 | 47 | 118–104 | (330) stopped at a modulus of 1.86 |
| 4 | 1:1 | 50 | 55 | 146–117 | 120) |
| 5 | " | 40 | 46 | 131–113 | 180) crystalline Na$_2$SiO$_3$ |
| 6 | " | 35 | 41 | 122–110 | 210) isolated as solid residue |
| 7 | 1:1.5 | 50 | 51 | 146–124 | 90 residue: crystalline Na$_2$SiO$_3$ |
| 8 | " | 40 | 43 | 131–117 | 115 |
| 9 | " | 30 | 33 | 118–110 | 170 |
| 10 | 1:2 | 50 | 48 | 146–129 | 60 residue crystalline Na$_2$SiO$_3$ |
| 11 | " | 40 | 40 | 131–120 | 105 |
| 12 | " | 30 | 31 | 118–112 | 180 |
| 13 | 1:3 | 50 | 46 | 146–134 | 55 |
| 14 | " | 40 | 37 | 131–123 | 105 |
| 15 | " | 30 | 29 | 118–114 | 180 |
| 16 | 1:5 | 50 | 43 | 146–138 | 36 |
| 17 | " | 40 | 35 | 131–123 | 105 |
| 18 | " | 30 | 29 | 118–114 | 180 |
| 19 | 1:7 | 40 | 34 | 131–126 | 60 |
| 20 | " | 30 | 26 | 118–115 | 115 |
| 21 | " | 20 | 17 | 108–107 | 180 |
| | | Conc. of KOH [Wt-%] | | | |
| 22 | 1:1 | 47 | 51 | 138–118 | 330 |
| 23 | " | 30 | 36 | 113–107 | (550) stopped at a modulus of 0.77 |
| 24 | 1:3 | 47 | 47 | 108–107 | 165 |

TABLE 3

Comparative Examples

| Input Modulus | Conc. of the Sodium Lye [Wt-%] | Reaction Time [Mins.] | Modulus Attained | Amount of Dissolved SiO$_2$ |
|---|---|---|---|---|
| Quartz: | | | | |
| 2:1 | 50 | 380 | 0.55 | 28 |
| 1:1 | 50 | 390 | 0.43 | 43 |
| 1:2 | 50 | 360 | 0.31 | 62 |
| 1:5 | 50 | 210 | 0.16 | 80 |
| Quartz Flour: | | | | |
| 1:1 | 50 | 360 | 0.62 | 62 |

TABLE 4

| Test No. | Type | Tempered Quartz [g] | NaOH (50 wt-%) [g] | Time [hrs] | Temp. [°C.] | Ignition Loss[1] [%] | Insoluble[2] [%] |
|---|---|---|---|---|---|---|---|
| 25 | A | 307 | 819 | 2 | 135–115 | 3.2 | 0.18 |
| 26 | A | 287 | 805 | 2 | 135–115 | 3.4 | 0.015 |
| 27 | B | 285 | 802 | 2 | 100 | n.d. | 25.0 |
| 28 | B | 273 | 884 | 3 | 125–115 | 2.9 | 0.38 |

[1] Ignition loss established at 1000° C.
[2] Insoluble components (10 g sample in 1000 ml of water, 5 min 60° C.
n.d. = not determined, because in these examples the reaction was not fully completed.

We claim:

1. A process for the production of alkali metal silicates, said process comprising reacting a material containing crystalline SiO$_2$ selected from the group consisting of cristobalite, tridymite, and mixtures thereof with aqueous, 20 to 50 wt % sodium or potassium hydroxide solution at temperatures in the range of 100° to 150° C. and under pressure of about one bar, the molar ratio of SiO$_2$ to Na$_2$O or K$_2$O in the reaction mixture lying in the range of from 2:1 to 1:7.

2. A process according to claim 1, wherein said crystalline SiO$_2$ material is quartz sand tempered at temperatures above 1000° C. in the presence of catalytic amounts of alkali comprising cristobalite, tridymite, or mixtures thereof, optionally also comprising amorphous silicon dioxide, is the material reacted with the sodium or potassium hydroxide solution.

3. A process according to claim 2, wherein the aqueous sodium or potassium hydroxide solution has a concentration of 40 to 50 wt- %.

4. A process according to claim 2, wherein the crystalline SiO$_2$-containing material is reacted with aqueous sodium hydroxide solution, the molar ratio of SiO$_2$ to Na$_2$O in the reaction mixture being 1:1.

5. A process according to claim 3, wherein the crystalline SiO$_2$-containing material is reacted with aqueous sodium hydroxide solution, the molar ratio of $SiO_2$ to $Na_2O$ in the reaction mixture being 2:1.

6. A process according to claim 5, comprising an additional step of filtering the obtained suspensions of solid, crystalline sodium polysilicate or solid, amorphous sodium silicate at a temperature of 90° to 110° C., and optionally comprising another additional step in which the mother liquor produced is concentrated and recycled into the process.

7. A process according to claim 1, wherein the aqueous sodium or potassium hydroxide solution has a concentration of 40 to 50 wt-%.

8. A process according to claim 2, wherein the crystalline $SiO_2$-containing material is reacted with aqueous sodium hydroxide solution, the molar ratio of $SiO_2$ to $Na_2O$ in the reaction mixture lying in the range of from 1.2:1 to 1:2.

9. A process according to claim 8, wherein the molar ratio of $SiO_2$ to $Na_2O$ in the reaction mixture is 1:1.

10. A process according to claim 1, wherein the crystalline $SiO_2$-containing material is reacted with aqueous sodium hydroxide solution, the molar ratio of $SiO_2$ to $Na_2O$ in the reaction mixture lying in the range of from 1.2:1 to 1:2.

11. A process according to claim 10, wherein the molar ratio of $SiO_2$ $Na_2O$ in the reaction mixture is 1:1.

12. A process according to claim 2, wherein the crystalline $SiO_2$-containing material is reacted with aqueous sodium hydroxide solution, the molar ratio of $SiO_2$ to $Na_2O$ in the reaction mixture being 2:1.

13. A process according to claim 1, wherein the crystalline $SiO_2$-containing material is reacted with aqueous sodium hydroxide solution, the molar ratio of $SiO_2$ to $Na_2O$ in the reaction mixture being 2:1.

14. A process according to claim 13, comprising an additional step of filtering the obtained suspensions of solid, crystalline sodium polysilicate or solid, amorphous sodium silicate at a temperature of 70° to 130° C. and optionally comprising another additional step in which the mother liquor produced is concentrated and recycled into the process.

15. A process according to claim 12, comprising an additional step of filtering the obtained suspensions of solid, crystalline sodium polysilicate or solid, amorphous sodium silicate at a temperature of 70° to 130° C. and optionally comprising another additional step in which the mother liquor produced is concentrated and recycled into the process.

16. A process according to claim 11, comprising an additional step of filtering the obtained suspensions of solid, crystalline sodium polysilicate or solid, amorphous sodium silicate at a temperature of 70° to 130° C. and optionally comprising another additional step in which the mother liquor produced is concentrated and recycled into the process.

17. A process according to claim 10, comprising an additional step of filtering the obtained suspensions of solid, crystalline sodium polysilicate or solid, amorphous sodium silicate at a temperature of 70° to 130° C. and optionally comprising another additional step in which the mother liquor produced is concentrated and recycled into the process.

18. A process according to claim 9, comprising an additional step of filtering the obtained suspensions of solid, crystalline sodium polysilicate or solid, amorphous sodium silicate at a temperature of 70° to 130° C. and optionally comprising another additional step n which the mother liquor produced is concentrated and recycled into the process.

19. A process according to claim 8, comprising an additional step of filtering the obtained suspensions of solid, crystalline sodium polysilicate or solid, amorphous sodium silicate at a temperature of 70° to 130° C. and optionally comprising another additional step in which the mother liquor produced is concentrated and recycled into the process.

20. A process according to claim 4, comprising an additional step of filtering the obtained suspensions of solid, crystalline sodium polysilicate or solid, amorphous sodium silicate at a temperature of 90° to 110° C. and optionally comprising another additional step in which the mother liquor produced is concentrated and recycled into the process.

* * * * *